Dec. 19, 1967   H. M. HUFFMAN   3,358,448
BRAKE MOTOR
Filed June 27, 1966

INVENTOR.
HERMAN M. HUFFMAN
BY
IRVIN L. GROH
ATTORNEY

United States Patent Office 3,358,448
Patented Dec. 19, 1967

3,358,448
BRAKE MOTOR
Herman M. Huffman, Corunna, Mich., assignor to Midland-Ross Corporation, Cleveland, Ohio, a corporation of Ohio
Filed June 27, 1966, Ser. No. 560,728
5 Claims. (Cl. 60—54.5)

The present invention relates to brake systems for automotive vehicles and especially to brake systems utilizing a dual-chamber brake master cylinder which transmits two separate and independent fluid pressures to the brake motors for each wheel.

More particularly, the invention relates to an improved fluid-actuated brake motor utilizing a floating piston and two power pistons and operable in response to either or both fluid pressures from the brake master cylinder or one alone.

For added safety, many automotive vehicles utilize brake assemblies with two independent fluid systems operable by a dual-chamber brake master cylinder. In the preferred arrangement of these assemblies, all of the wheels of the vehicle are operable by either one of the two separate fluid-pressure systems or both so that, in the event of a pressure failure in one system, full braking action will still be available at all of the wheels.

The brake motor for vehicles having this capability must, therefore, have connections for and be operable by either or both of the two systems. A typical brake motor having this capability is shown in the U.S. patent to Bowen, Number 2,275,722. This type of brake motor utilizes a cylinder, a central floating piston, two power pistons located one at each end of the cylinder, and fluid inlets which admit fluid under pressure between the ends of the floating piston and the power pistons. Accordingly, under normal conditions, the motor is operated by the application of pressure from both fluid inlets and the floating piston will remain stationary. However, when a pressure failure occurs in one of the fluid systems, the fluid pressure from the other system will still be effective to provide complete braking action by forcing one of the power pistons and the floating piston in opposite directions. This serves to operate both power pistons with equal force.

Because of the additional fluid required from the operative system to operate the brakes when the other of the systems fails, greater brake pedal travel will be needed and this will warn the vehicle operator of the partial failure. However, a failure of one of the annular seals at the ends of the floating piston cannot be detected by the vehicle operator since the fluid could not escape from the cylinder and brake pedal travel would be normal. This type of failure coupled with a pressure failure in the fluid system supplying fluid to the end of the floating piston opposite the end with the damaged seal, would result in a total brake failure.

The improved brake motor of the present invention satisfies the above objection and provides advantages not obtainable from the prior art.

According to the invention, there is provided a brake motor operable by either or both of two independent fluid pressure systems and including a cylinder having two power pistons and a floating piston located therebetween. The floating piston has annular end seals to contain fluid under pressure at opposite ends thereof so that the force supplied by the fluid pressure will be directed against the inward ends of the power pistons. Located on the floating piston, between the two annular end seals, is an annular space which communicates with a vent adapted to release fluid from the annular space from the brake cylinder. Accordingly, when one of the annular end seals fails, fluid passing beyond the seal will enter the annular space and, from there, be vented out of the cylinder. Accordingly, a failure of one of the seals will result in increased brake pedal travel which will warn the vehicle operator of the condition.

In a preferred embodiment of the invention, a small rubber ball is tightly received in the vent to prevent entry of dirt and other contaminants.

It is among the objects of the invention to warn the operator of an automotive vehicle having floating piston-type brake motors operable by either one of two independent fluid pressure systems or both, of a failure of one of the annular end seals of the floating piston.

Other objects, uses and advantages of the invention will be apparent from the following detailed description and drawings which illustrate a preferred form of the invention, wherein like parts are identified by like numerals and wherein.

Figure 1:
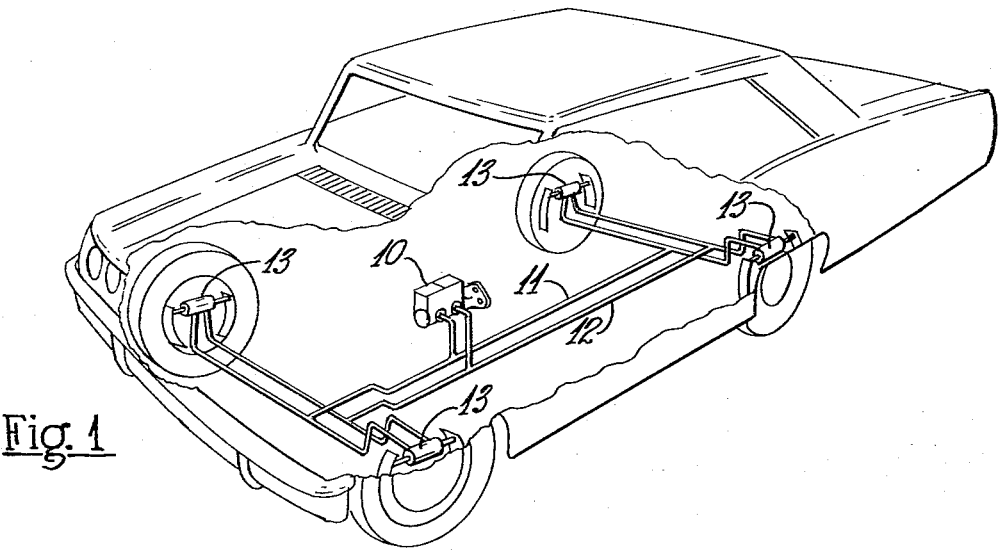
FIGURE 1 is a perspective view of an automotive vehicle with parts broken away to show a brake assembly for a vehicle utilizing a dual-chamber brake master cylinder and two independent fluid-pressure systems connected to the brake motors for each wheel.
Figure 2:
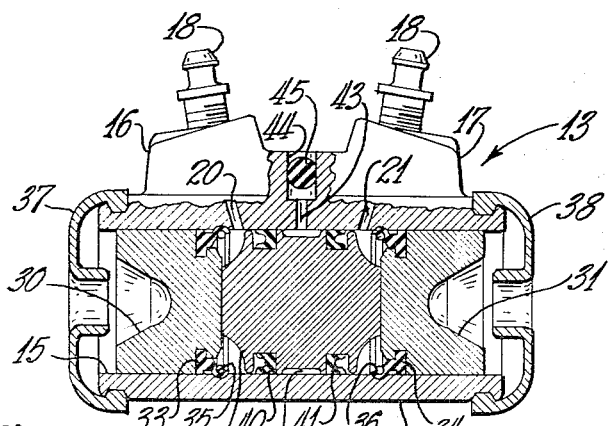
FIGURE 2 is an elevational view of a brake motor embodying the invention with parts broken away and shown in section; and, FIGURE 3 is an end-elevational view of the brake motor of FIGURE 2 with parts broken away and shown in section.
Figure 3:
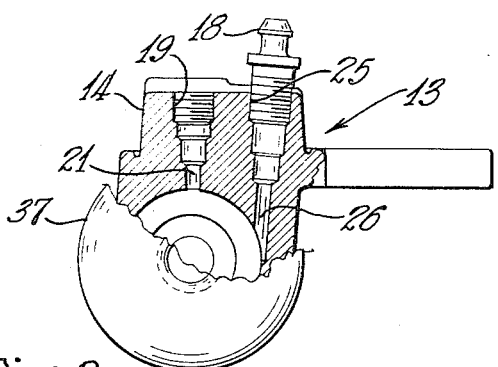

Referring more particularly to the drawings FIGURE 1 shows a four-wheeled passenger vehicle with a brake assembly including a dual-chamber brake master cylinder 10; two independent fluid-pressure systems 11 and 12 communicating with the brake master cylinder 10; and, a brake motor 13 for each wheel. The brake motor 13, best shown in FIGURES 2 and 3, comprises a cast housing 14 having a cylindrical bore 15. The housing 14 has two bosses 16 and 17 which are drilled and tapped for reception of bleed screws 18 and inlet fittings (not shown) for each fluid-pressure system 11 and 12. The receptacle 19 for each inlet fitting communicates with a passage 20 or 21 which extends into the cylindrical bore 15. The threaded receptacle 25 for each bleed screw 18 communicates with a passage 26 which also extends to the cylindrical bore 15.

Located within the cylindrical bore 15 are two power pistons 30 and 31 and a floating piston 32. Located at the inner end of each power piston 30 and 31 is a static seal 33 or 34 which is retained in annular grooves formed in the bore 15, by means of expander rings 35 and 36. The ends of the cylindrical bore 15 are partially enclosed by dust boots 37 and 38.

Mounted at each end of the floating piston 32 are annular seals 40 and 41. The annular seals 34 and 41 serve to contain fluid supplied through the inlet passage 21 in a space between the floating piston 32 and the power piston 31. The annular seals 33 and 40 serve to contain fluid supplied through the other inlet passage 20 in a space between the power piston 30 and the floating piston 32. Accordingly, under normal operating conditions, the floating piston 32 will remain stationary whenever the brakes are actuated by the entry of fluid under pressure from the fluid-pressure systems 11 and 12.

The floating piston 32 has a central annular groove 42 located between the seals 40 and 41. A vent 43 communicates between the annular groove 42 and the exterior of the housing 14 to provide an outlet for any fluid which might move into the groove 42 due to a failure of one of the seals 40 and 41. Located in a counterbore 44 of the vent 43 is an elastic ball 45 having a diameter slightly larger than the counterbore 44 to provide a tight fit. The ball 45 serves to normally prevent dirt and other contaminants from entering the cylinder but is forced out of the counterbore 44 whenever a fluid pressure builds up in the groove 42.

Under normal operating conditions, actuation of the brake cylinder will energize the brake motor by forcing fluid under pressure from the fluid-pressure lines 11 and 12 into the space at the opposite ends of the floating piston 32. The pressure will force the power pistons 30 and 31 in opposite directions in the bore 15 to apply the brakes. When one of the fluid-pressure lines 11 and 12 has a pressure failure for any reason, the fluid pressure from the opposite line will be supplied to one side of the floating piston 32 and will force the piston 32 against one of the power pistons 30 and 31 so that both pistons will be operated by one fluid-pressure line. This provides full brake application for all four wheels of the vehicle but the failure in one line can be detected by the vehicle operator due to the increased brake pedal travel required.

In the event that both fluid-pressure lines 11 and 12 are operating normally and one of the seals 40 and 41 should fail, fluid under pressure will pass beyond the seal and into the annular groove 42 and eventually out through the vent 43. Even though both fluid-pressure systems 11 and 12 are operating normally, the seal failure will be detectable by the vehicle operator since the escape of fluid will cause an increased brake pedal travel. During this condition, full braking action will still be available since the fluid at the end of the floating piston 32 opposite the defective seal will force the floating piston 32 against the appropriate power piston to provide full brake application.

While the invention has been described with reference to a specific embodiment thereof, this is intended for the purpose of illustration rather than limitation and other variations and modifications will be apparent to those skilled in the art upon a reading of the specification, all within the intended spirit and scope of the invention as defined in the following claims.

I claim:

1. In a brake motor operable by either or both of two independent fluid-pressure systems and including a cylinder having two power pistons and a floating piston therebetween, the floating piston having annular end seals to contain fluid under pressure at opposite ends thereof; the improvement which comprises means defining an annular space between said floating piston and said cylinder and between said end seals, and a vent communicating with said space whereby, when one of said end seals fails, fluid entering said space will be vented from said cylinder.

2. A brake motor as defined in claim 1 including an elastic ball normally compressibly received in said vent, said ball being removable from said vent in response to fluid pressure resulting from entry of fluid under pressure into said vent.

3. In a brake motor,
a cylinder,
a power piston located in said cylinder,
sealing means between said cylinder and said power piston,
a floating piston located in said cylinder adjacent to one end of said power piston,
means for introducing fluid under pressure between said floating piston and said power piston,
said floating piston and said cylinder defining therebetween an annular space,
sealing means located on opposite sides of said annular space to prevent entry of fluid into said space, and
a vent communicating with said space,
whereby, when a sealing means on a side of said annular space fails, fluid entering said space will be vented from said cylinder.

4. The invention of claim 3 including a second power piston located on the other side of said floating piston,
sealing means between said cylinder and said second power piston,
means for introducing fluid under pressure between said floating piston and said second power piston,
means normally sealing said vent,
and said means being removable from said vent in response to fluid pressure resulting from entry of fluid under pressure into said vent.

5. In combination, a fluid brake assembly for an automotive vehicle, comprising a dual-chamber brake master cylinder and two independent fluid-pressure systems operable by said master cylinder; and a brake motor operable by either or both of said fluid-pressure systems, comprising a cylinder, two power pistons located in said cylinder, a floating piston located in said cylinder between said power pistons, first means for introducing fluid from one of said fluid-pressure systems between said floating piston and one of said power pistons, second means for introducing fluid from the other of said fluid-pressure systems between said floating piston and the other of said power pistons, said floating piston and said cylinder defining therebetween an annular space, sealing means located on opposite sides of said annular space to prevent entry of fluid into said space and a vent communicating with said space whereby, when a sealing means on a side of said annular space fails, fluid entering said space will be vented from said cylinder.

References Cited
UNITED STATES PATENTS 2,275,722   3/1942   Bowen _____ 60—54.6

MARTIN P. SCHWADRON, *Primary Examiner.*

ROBERT R. BUNEVICH, *Examiner.*